United States Patent [19]

Sidoti

[11] Patent Number: 4,632,616
[45] Date of Patent: Dec. 30, 1986

[54] SIMULATED BOLT

[76] Inventor: Kenneth C. Sidoti, 17601 Mapleboro Rd., Maple Heights, Ohio 44137

[21] Appl. No.: 682,330

[22] Filed: Dec. 17, 1984

[51] Int. Cl.$^4$ ............................................ F16B 15/02
[52] U.S. Cl. .................................. 411/480; 411/903; D8/388
[58] Field of Search ............... 411/480, 439, 901, 902, 411/903, 396, 397, 394; D8/388

[56] References Cited

U.S. PATENT DOCUMENTS

| | | | |
|---|---|---|---|
| D. 46,669 | 11/1914 | Gorsuch | D8/391 |
| D. 188,950 | 10/1960 | Miller | D8/391 |
| D. 229,538 | 6/1982 | Steffan | D8/391 |
| D. 241,413 | 9/1976 | Drake | 411/388 X |
| D. 264,807 | 12/1973 | Baumgartner | D8/387 |
| 55,917 | 6/1866 | Seymour | 411/397 |
| 119,648 | 10/1871 | Richards | 411/397 |
| 322,471 | 7/1885 | Otto | 292/152 X |
| 346,148 | 7/1886 | Durham | 411/388 |
| 1,425,873 | 8/1922 | Lineaweaver | 411/480 |
| 2,159,182 | 5/1939 | Sahlmann | 411/439 X |
| 2,350,346 | 6/1944 | Gaskell | 411/387 |
| 3,134,290 | 5/1964 | Jentoft | 411/377 |
| 3,747,143 | 7/1973 | Eager | 411/387 |
| 4,373,842 | 2/1983 | Bettini et al. | 411/377 |
| 4,417,571 | 11/1983 | Nelson | 411/903 X |
| 4,540,322 | 9/1985 | Coffia | 411/338 |

FOREIGN PATENT DOCUMENTS

| | | | |
|---|---|---|---|
| 1078088 | 5/1954 | France | 411/388 |
| 124811 | 3/1928 | Switzerland | 411/439 |
| 12400 | 6/1895 | United Kingdom | 411/439 |

Primary Examiner—Gary L. Smith
Assistant Examiner—Adrian H. Whitcomb, Jr.
Attorney, Agent, or Firm—Fay, Sharpe, Fagan, Minnich & McKee

[57] ABSTRACT

To give an otherwise fastened wood or wood-like structure the appearance of a bolted construction, first and second wood or wood-like structural members are provided. Each member has first and second sides with the first member second side being positioned adjacent the second member first side. The two members are thereupon fastened together. A simulated bolt head is then secured to the first member first side with a simulated bolt end being secured to the second member second side so that the simulated bolt head lines up with the simulated bolt end giving the appearance of a bolt passing through the structure. A simulated bolt for use in giving the appearance of a bolted construction in a wood or wood-like structure includes a fastener, having a shank and a tip, as well as a simulated bolt portion. The fastener and the simulated bolt portion are secured to each other.

8 Claims, 6 Drawing Figures

SIMULATED BOLT

BACKGROUND OF THE INVENTION

The present invention generally pertains to fasteners. More specifically, the present invention relates to a simulated bolt and a method for its use to give the appearance of a bolted construction in wood or wood-like structures which are otherwise fastened.

In expensively made homes, wooden ceiling beams are oftentimes bolted together. In less expensively made homes, however, wooden ceiling beams and the like are usually nailed together with less expensive fasteners, such as twenty penny spikes, which also take considerably less time to install. In other homes, wood-like simulated ceiling beams, usually made of a molded plastic, are installed strictly for decorative purposes. Some people, in an attempt to improve the appearance of inexpensively fastened wood structures or even simulated wood structures, will apply bolts and nuts to the structures for decorative purposes. This, however, requires time-consuming drilling and a fair amount of expenditure for the hardware installed. It would thus be desirable to provide simulated bolt heads and bolt ends which could be easily installed in wood or wood-like structures, such as ceiling beams, railings, patio decks and the like, to give the appearance of expensive bolted structures.

Accordingly, it has been considered desirable to develop a new and improved simulated bolt assembly and method for its use which would overcome the foregoing difficulties and meet the above stated needs and others while providing better and more advantageous overall results.

BRIEF SUMMARY OF THE INVENTION

In accordance with the present invention, a new and improved simulated bolt is provided for use in giving the appearance of a bolted construction in wood or wood-like structures.

More particularly in accordance with the invention, the simulated bolt includes a fastener having a shank and a tip as well as a simulated bolt portion. A means is provided for securing the fastener and the simulated bolt portion to each other.

According to another aspect of the invention, the fastener also includes a head portion and the simulated bolt portion is made of a plastic material which is secured to the fastener head portion.

According to still another aspect of the invention, the simulated bolt portion is made of metal and the securing means comprises welding, soldering, brazing or the like.

In accordance with a yet further aspect of the invention, the simulated bolt portion includes a bolt head and an adjacent washer.

In accordance with still another aspect of the invention, the simulated bolt portion includes a bolt shank, a nut, threaded, molded or otherwise attached to the shank, and a washer adjacent to the nut.

In accordance with another aspect of the invention, a method for giving an otherwise fastened wood or wood-like structure the appearance of a bolted construction is provided.

More particularly in accordance with this aspect of the invention, the method includes providing first and second structural members each having first and second sides. The first member second side is positioned adjacent to the second member first side and the two members are thereupon fastened to each other. A simulated bolt head is then secured to the first member first side. A simulated bolt end is similarly secured to the second member second side so that the simulated bolt head lines up with the simulated bolt end thereby giving the appearance of a bolt passing through the first and second structural members.

The principal advantage of the present invention is the provision of a new simulated bolt portion which, when installed, gives the appearance of a bolted construction in wood or wood-like structures which are otherwise fastened.

Another advantage of the invention is the provision of a plastic bolt portion which can be molded or otherwise secured to a conventional nail or other fastener thus making the structure inexpensive and at the same time easy to secure to a wood or wood-like member.

Still another advantage of the invention is the provision of a cast or molded metal simulated bolt portion which may be secured by welding or the like to a fastener shank and easily secured thereby to a wood or wood-like structure.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
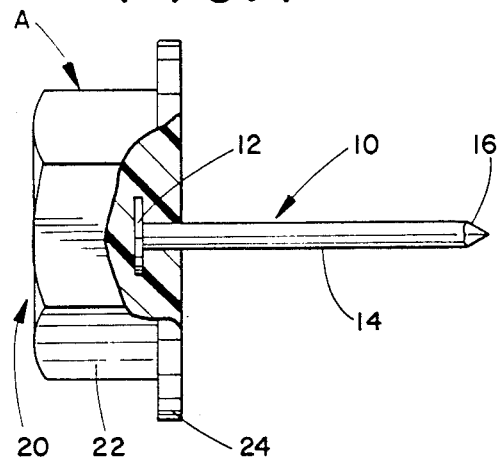
FIG. 1 is a side elevational view in partial cross section of a simulated bolt head.
Figure 2:
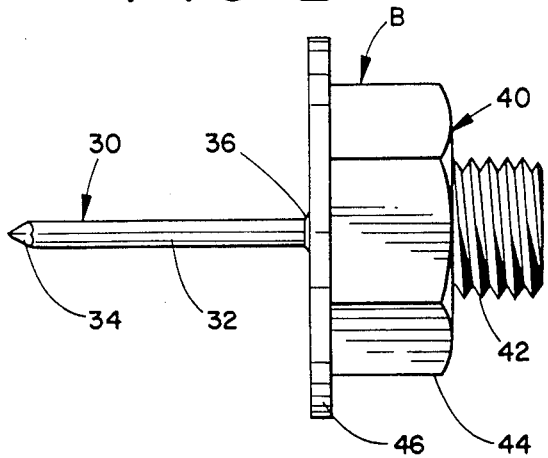
FIG. 2 is a side elevational view of a simulated bolt end.

Referring now to the drawings, wherein the showings are for purposes of illustrating preferred embodiments of the invention only and not for purposes of limiting same, FIG. 1 shows the subject new simulated bolt head A, with FIG. 2 showing the subject new simulated bolt end B. While the simulated bolt portions A, B are primarily designed for and will hereinafter be described for use in connection with real wood or simulated wood structures, such as ceiling beams, it will be appreciated that the overall inventive concept could be adapted for decorative use in other environments, such as railings, patio decks, bookcases, or the like.

Figure 3:
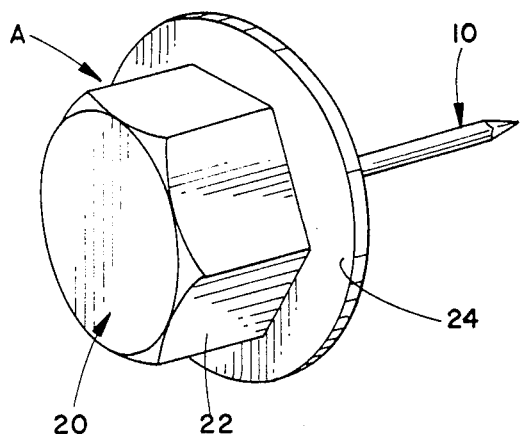
FIG. 3 is a perspective view of the bolt head of FIG. 1.
Figure 4:
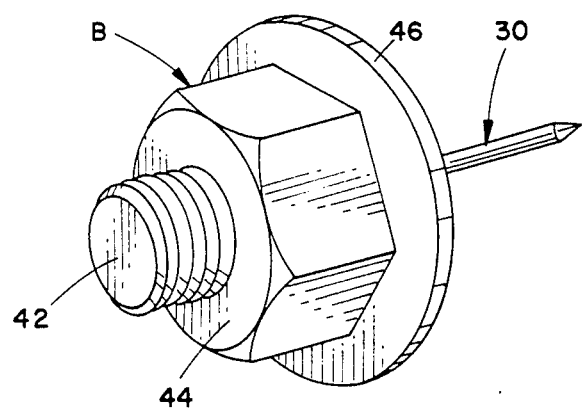
FIG. 4 is a perspective view of the bolt end of FIG. 2.

More particularly and with reference to FIGS. 1 and 3, a simulated bolt head A includes a fastener 10 which can have a head portion 12, a shank portion 14, as well as a pointed tip 16. A simulated bolt head structure 20 mounted to the nail 10, may be made of plastic or the like and may be molded or otherwise secured around the nail head 12 as shown in FIG. 1. The bolt head structure 20 includes a simulated bolt head 22 as well as a simulated washer 24 positioned adjacent thereto. It is evident from FIG. 1 that the bolt head and washer 22, 24 are integral although they give the appearance of being two separate adjacent members.

In contrast to FIGS. 1 and 3, FIGS. 2 and 4 illustrate a simulated bolt end B forming the opposing end of the simulated bolt. The bolt end B includes a fastener portion 30 which can have a shank 32 as well as a pointed tip 34. In contrast to the molded structure disclosed in FIG. 1, the fastener portion 30 is attached at 36 to a metallic simulated bolt end body 40 by welding, soldering, brazing or the like. The bolt end body 40 includes a threaded portion 42 upon which a nut 44 appears to be threaded. Closely adjacent the nut 44 is a simulated washer 46. The end portion 42, nut 44 and washer 46 appear to be separate members but can be in reality, an integral metallic body which may be cast or molded to the desired shape. The body 40 is secured by welding, soldering, brazing or the like to the fastener portion 30.

The fasteners 10, 30 of FIGS. 1 through 4 are described as being either headed or headless nails. However, it will be immediately obvious that a variety of other fastening means could be employed, such as screws or small threaded machine bolts.

It should be recognized that what is disclosed in FIGS. 1 and 2 are two alternate embodiments of making the simulated bolt portions of the present invention. It is evident that both ends of the bolt may be made of a plastic material which is molded or otherwise secured around a suitable fastener. Alternatively, both ends of the bolt may be made from a cast or molded metal to which a fastener may be secured in any conventional manner, such as welding.

It should also be appreciated that the simulated bolt portions to which the present concept applies could be fabricated from genuine bolt parts suitably attached or secured to one another and provided with an appropriate fastener. The bolt parts could also be separately molded or stamped and suitably secured to each other by adhesive or the like or by snap-fitting the parts together. Alternatively, such portions, fasteners included, could be molded cast or forged in unitary form to avoid the necessity of separately affixing the fasteners to the remaining parts.

Figure 5:
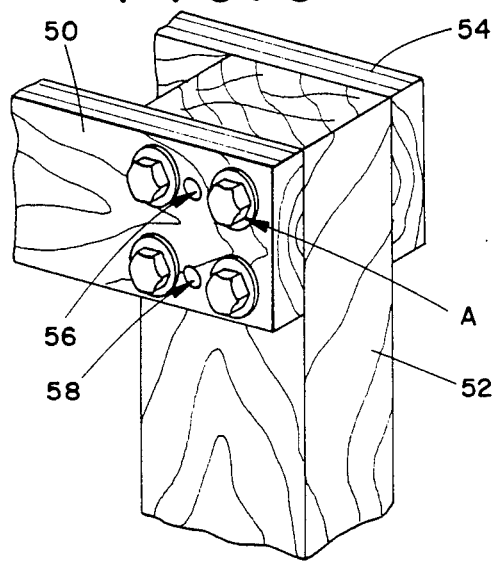
FIG. 5 is a perspective view in reduced scale of a fastened wood or wood-like structure to which simulated bolt portions according to FIGS. 1 and 2 are secured; and, FIG. 6 is a top plan view, in partial cross section, of the structure of FIG. 5.
Figure 6:
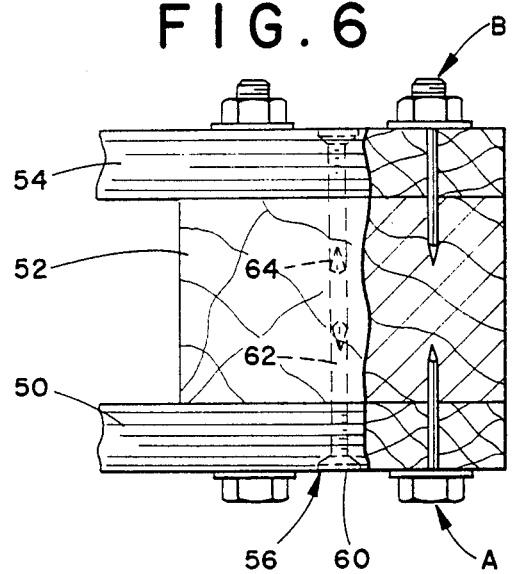

With reference now to FIGS. 5 and 6, a conventional wood or wood-like construction C may include a first board or plank 50, a post 52 adjacent thereto, as well as a second board 54 disposed on the other side of the post. The three structural members may be secured to each other by conventional inexpensive fasteners 56, 58 which may be in the nature of twenty penny spikes. Each of the spikes 56 may have a head portion 60, a shank portion 62, as well as a pointed end portion 64. One or more spikes may be driven into the first structural member 50 to connect it to the post 52 and similarly into the second structural member 54 to connect it also to the post 52. It is evident that the spikes can overlap each other as long as they are positioned in vertically spaced planes, as is illustrated in FIG. 6.

In order to provide the appearance of an expensive bolted construction for this economically fastened structure, a simulated bolt head A may be driven into the first structural member 50 and a simulated bolt end B may be driven into the second structural member 54. If the bolt head and bolt end A, B are fastened in alignment with each other, the structure C is given the look of a bolted construction, although in reality the structure is held together by the much more inexpensive and easier to install spike fasteners 56, 58. Of course, more than one bolt head and bolt end may be provided for the structure, as illustrated, if that is desired.

Alternatively, the simulated bolt portions A, B could be secured to the structural members 50, 54 by a suitable adhesive. It is evident that in this case the fasteners 10, 30 secured to the bolt body portions 20, 40 would not be necessary.

The subject invention thus provides simulated bolt portions for use in giving the appearance of a bolted construction in a wood or wood-like structure which is fastened together by inexpensive fasteners. The simulated bolt assembly of the invention is adapted for use in a wide variety of environments ranging from ceiling beams, to railings, patio decks and the like.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A simulated bolt assembly for use in giving the appearance of a bolted construction in a wood or wood-like structure which is fastened together by a separate fastening means, the assembly comprising:
   a simulated bolt head portion having a first fastener shank extending therefrom, said head portion including a bolt head and an adjacent washer, which are secured together; and,
   a simulated bolt end portion having a second fastener shank extending therefrom, said end portion including a threaded bolt shank, a nut adjacent to said bolt shank and a washer positioned adjacent said nut, said nut, bolt shank and washer being secured together, and said bolt head and end portions being opposite ends of the bolt assembly, said first and second fastener shanks being designed to hold the bolt head portion and bolt end portion to an associated structure so that it appears as if the associated structure has a bolted construction.

2. The assembly of claim 1 wherein said simulated bolt head and end portions are made of plastic.

3. The assembly of claim 2 wherein said simulated bolt head and end portions are each secured to said respective first and second fastener shanks.

4. The assembly of claim 8 wherein said simulated bolt head and end portions are made of a metal.

5. The assembly of claim 4 wherein a respective one of said first and second fastener shanks are secured to said simulated bolt head and end portions.

6. A simulated bolt assembly for use in giving the appearance of a bolted construction in a wood or wood-like structure which is, in reality, fastened together by a separate fastening means, the assembly comprising:
   a simulated bolt head portion including a bolt head and an adjacent washer, which are secured together;
   a simulated bolt end portion including a threaded bolt shank, a nut adjacent to said bolt shank and a washer positioned adjacent said nut;
   first securing means for securing said simulated bolt head to one side of an associated structure; and, second securing means for securing said simulated bolt end to an opposing side of the associated structure to give the appearance of the simulated bolt assembly extending through the associated structure, wherein said first and second securing means serve only to secure said simulated bolt head portion and bolt end portion to the associated structure and not to fasten elements of the associated structure to each other.

7. The assembly of claim 6 wherein said first and second securing means include fastener shanks.

8. The assembly of claim 6 wherein said associated structure is fastened together by an associated fastening means.

* * * * *